(12) United States Patent
Bajgur et al.

(10) Patent No.: US 6,689,825 B1
(45) Date of Patent: Feb. 10, 2004

(54) ADDITIVE FOR THERMOPLASTIC RESINS AND FLAME RETARDANT RESIN COMPOSITIONS

(75) Inventors: Chandra S. Bajgur, Bangalore (IN); William Pecak, Cohoes, NY (US); Radhakrishna Arakali, Bangalore (IN)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/065,886

(22) Filed: Nov. 27, 2002

(51) Int. Cl.$^7$ .............................. C08K 5/34; C08K 5/52; C08K 5/16

(52) U.S. Cl. ..................... 524/100; 524/94; 524/127; 524/141; 524/142; 524/175; 524/200; 524/204; 524/399; 252/609; 252/400.21; 252/400.53

(58) Field of Search .............................. 524/100, 127, 524/141, 142, 175, 200, 204, 399, 94; 252/609, 400.21, 400.53

(56) References Cited

U.S. PATENT DOCUMENTS

| | | | |
|---|---|---|---|
| 3,257,357 A | 6/1966 | Stamatoff | |
| 3,257,358 A | 6/1966 | Stamatoff | |
| 3,306,874 A | 2/1967 | Hay | |
| 3,306,875 A | 2/1967 | Hay | |
| 3,383,435 A | 5/1968 | Cizek | |
| 3,914,266 A | 10/1975 | Hay | |
| 4,017,457 A | 4/1977 | Baron et al. | |
| 4,028,341 A | 6/1977 | Hay | |
| 4,128,602 A | 12/1978 | Katchman et al. | |
| 4,128,603 A | 12/1978 | Katchman et al. | |
| 4,154,712 A | 5/1979 | Lee, Jr. | |
| 4,254,775 A | 3/1981 | Langer | |
| 4,526,917 A | 7/1985 | Axelrod | |
| 4,806,297 A | 2/1989 | Brown et al. | |
| 4,806,602 A | 2/1989 | White et al. | |
| 4,935,472 A | 6/1990 | Brown et al. | |
| 5,081,185 A | 1/1992 | Haaf et al. | |
| 5,089,566 A | 2/1992 | Brown et al. | |
| 5,206,276 A | 4/1993 | Lee, Jr. | |
| 5,376,724 A | 12/1994 | Bailly et al. | |
| 6,054,515 A | * 4/2000 | Blount | 524/118 |
| 6,414,084 B1 | 7/2002 | Adedeji | |

OTHER PUBLICATIONS

Jurgen Troitzsch et al., "International Plastics Flammability Handbook", 2nd Edition, 1990, pp. 47–49.
Linteris, G.T. et al., "Flame Inhibition by Ferrocence and Blends of Inert and Catalytic Agents", Proceedings of the Combustion Institute, vol. 28, 2000/pp. 2965–2972.
Abstract for GB1536525 Publication date Dec. 20, 1978. Data supplied from the esp@cenet database.
Patent Abstract of Japan for 55–082149 Publication Date Jun. 20, 1980.
Patent Abstract of Japan for 08–073720 Publication Date Mar. 19, 1996.
Patent Abstract of Japan for 05–179123 Publication Date Jul. 20, 1993.
Patent Abstract of Japan for 06–192553 Publication Date Jul. 12, 1994.
Chemical Abstract for JP 52142751 Nov. 28, 1977 Accession No.: 1978:51605 CAPLUS.
Chemical Abstract for JP 05018356 Mar. 11, 1993 Accession No.: 1988:187 888 CAPLUS.
Patent Abstract of Japan for 05–239260 Publication Date Sep. 17, 1993.
Chemical Abstract for JP 02037370 Aug. 23, 1990 Accession No.: 1984:52558 CAPLUS.
Patent Abstract of Japan for 05–247264 Publication date Sep. 24, 1993.

* cited by examiner

*Primary Examiner*—Kriellion A. Sanders

(57) ABSTRACT

A thermoplastic resin composition with improved flame retardance, flow and heat deflection temperature includes a thermoplastic resin; resorcinol diphenyl phosphate; and an additive blend. The additive blend includes a combination of melamine polyphosphate and ferrocene. The thermoplastic composition reduces the amounts of resorcinol diphenyl phosphate required for effective flame retardancy. Moreover, the effective amounts of melamine polyphosphate and ferrocene do not deleteriously affect other properties of the thermoplastic composition such as Izod strength, flow properties, and heat deflection temperatures. A process for manufacturing a thermoplastic composition is also disclosed.

24 Claims, No Drawings

ADDITIVE FOR THERMOPLASTIC RESINS AND FLAME RETARDANT RESIN COMPOSITIONS

BACKGROUND

The present disclosure relates to an additive for thermoplastic resins and to resin compositions containing such additives. In particular, the present disclosure relates to additives which enable improved flame retardant characteristics, heat deflection temperatures and flow rates of thermoplastic resins such resin compositions containing polyphenylene ether (PPE), high impact polystyrene (HIPS) and the like. The present disclosure also relates to a process for the preparation of a thermoplastic resin composition containing such additives and with improved flame retardant, heat deflection temperature and flow properties.

Thermoplastic resins have use in different industries such as materials for parts of electric and electronic appliances and also for parts of automobiles. Thermoplastic resin compositions such as high impact polystyrene (HIPS) and polyphenylene ether (PPE) resin compositions are also useful as adhesives, sealants, gels, automotives, cabling, electrical applications, aerospace, sporting equipment, electrical laminates and IC encapsulation materials. Polyphenylene ether resins are also useful as additives for various thermoplastic and thermoset materials. The physical, electrical and chemical properties of polyphenylene ether resin compositions make them ideal for a wide variety of industrial applications.

U.S. Pat. Nos. 3,383,435; 4,128,602 and 4,128,603 disclose thermoplastic polymer blends comprising polyphenylene ether (PPE) and vinylaromatic polymers, such as styrene polymers which are useful as molding materials. An important advantage of the polymer blends comprising polyphenylene ethers and styrene polymers is that, by admixing halogen-free additives, in particular phosphorus-containing compounds, it is possible to obtain molding materials which are flame-retardant and can therefore be used for many applications in the electrical industry. In particular, the test for flame retardancy according to UL 94 is critical for use in the electrical industry. In this test, a flame is applied repeatedly to vertically fastened test specimens. The test specimen heats up to a very great extent. In some cases, this leads to the dripping of flaming polymer material and ignition of the cotton wool mounted below the rod. This undesirable behavior is observed in particular when large amounts of flameproofing agents must be used in order to achieve short combustion times.

Styrenic polymer compositions such as HIPS, containing various polymeric additives such as rubbers to improve mechanical properties, acrylonitrile/butadiene/styrene (ABS) type compositions are widely used because of their mechanical properties. HIPS for example is widely used in the production of molded consumer goods, such as in the production of parts of television cabinets. ABS is used in production of parts that require higher toughness and chemical resistance. However, styrenic type polymers suffer from relatively high flammability, thereby limiting their applications involving subjection of the molded parts to high temperatures.

Several attempts have been made in the art to improve the flame retardancy of thermoplastic resins such as PPE and HIPS compositions. However, most of the solutions offered suffer from one disadvantage of the other.

Resorcinol bis(diphenyl phosphate) (also referred herein as "RDP") has been used as a flame retardant aid in PPE/PPO/HIPS formulations to give effective flame retardance performance. It is also an effective plasticizer, which provides desirable mechanical and chemical properties to the polymer resin. In the art, it is also known that the amount of RDP in the thermoplastic resin should preferably be at a minimum both from the point of view of the cost of the additive and also since it has been that large amounts of RDP (greater than about 16–20 parts of RDP) result in reduction of the modulus of the resin formulation as well as impairs the heat deflection temperature properties of the resin formulation. Several compounds have been tried in the art as co-additives with RDP that would enable the reduction of RDP in the resin formulation. For example, both ferrocene and melamine polyphosphate have been tried individually as co-additives for RDP to be used in resin formulations. However, a problem faced in the use of either ferrocene or melamine polyphosphate as a co-additive with RDP is that while it is possible to reduce the amount of RDP and retain the flame retardance performance of the resin formulation, other properties of the resin such as flowability and Izod impact are impaired. In particular, for example, when melamine polyphosphate is used as a co-additive, to obtain effective flame retardance, large quantities thereof have to be used. This often results in bleeding of the melamine polyphosphate from the resin at high temperatures during processing.

It is also known in the art for example that addition of a halogen flame retardant imparts flame retardancy to thermoplastic polyester resins. However, the use of halogen flame retardants results in the formation of halogen compounds which act as impurities in the resin compositions. It is also observed that halogen products are sometimes formed as thermal decomposition products and result in corrosion of the kneader, molding machine, mold, and other equipment used in the kneading and molding steps. The use of halogen based flame retardants also suffers from the added disadvantage of formation of poisonous gas due to decomposition thereof.

Attempts have been made to avoid the use of halogen based flame retardants by using phosphorous based compounds. For example, Japanese published application JP-A 55-82149 discloses a method for improving flame retardancy of thermoplastic polyester compositions comprising addition of red phosphorus or a phosphoric acid compound thereto. However, it is observed that the addition of red phosphorous while avoiding the disadvantages of use of halogen based flame retardants does not improve the flame retardancy. This problem is sought to be overcome in the process disclosed in Japanese published application JP A 8-73720. The process disclosed herein comprises the addition of a calcium or aluminum salt of phosphinic acid to the polyester. The disadvantage of this process however is that in order to enhance the flame retardancy, the additive has to be added in large quantities, as a result of which the moldability of the polyester is impaired.

JP-A-5-179123 discloses a composition which is made flame-retardant by addition of an organic phosphorus flame retardant. The flame-retardant resin composition of this disclosure comprises inter alia, a polycarbonate resin and contains an organic phosphorus flame retardant, a boron compound, organopolysiloxane, and a fluororesin. The flame-retardant resin composition of JP-A-6-192553 comprises a polycarbonate resin and a polyalkylene terephthalate resin and contains a graft copolymer, an oligomeric organic phosphorus flame retardant, and a fluorinated polyolefin.

However, the use of red phosphorus poses several handling problems. Red phosphorous poses the danger of dust explosion and also may emit smell or gas when processed in high temperature. It is also observed that red phosphorus alone does not provide the desired flame retardance and requires to be used in either large quantities or in combination with another flame retardant or a flame retardation aid. Attempts have been made to overcome these problems by coating the surface of red phosphorus for stabilization. For example, JP-A-52-142751, JP-B-5-18356, and JP-A-5-239260 disclose red phosphorus coated with a thermosetting resin, aluminum hydroxide, and the like. JP-B-2-37370 proposes a flame-retardant resin composition comprising a polyester resin and thermosetting resin-coated red phosphorus and, if desired, a reinforcing filler. JP-A-5-239260 and JP-A-5-247264 disclose a flame-retardant resin composition comprising a thermoplastic resin such as polycarbonate, polyester resin, and the like, and electrolessly plated red phosphorus.

In the fields where such flame-retardant resin compositions are used as, for example, electric and electronic parts, simplification of assembly and cost reduction have been desired, and it has been promoted to make parts integral or thinner. Therefore, materials used in these parts are required to show satisfactory flowability in molding and to maintain high heat resistance and high flame retardance.

Addition of organic phosphorus flame retardant to a polycarbonate resin in an attempt to impart sufficient flame retardance also results in considerable reduction in heat resistance. Polycarbonate resin compositions containing red phosphorus or stabilized red phosphorus also lack long-term heat stability. Thus, moldings made thereof are often deformed on prolonged exposed to a temperature no higher than around 150° C. Another problem faced in the use of phosphorous-based flame retardants is that the compositions obtained thereby suffer from poor molding processability due to low flowability. While the problem of flow can be overcome by molding at a high temperature, this results in the red phosphorous emitting a disagreeable smell and decomposition gas being generated which contaminates the mold.

In the prior art, preferred flame retardant aids include phosphorous compounds such as elemental phosphorous, organic phosphonic acids, phosphonates, phosphinates, phosphinites, phosphine oxides such as triphenylphosphine oxide, phosphines, phosphites and phosphates. Suitable phosphates include phenylbisdodecyl phosphate, phenylbisneopentyl phosphate, phenylethylene hydrogen phosphate, phenyl-bis-3,5,5'-trimethylhexyl phosphate, ethyldiphenyl phosphate, 2-ethylhexyl di(p-tolyl), phosphate, diphenyl hydrogen phosphate, bis (2-ethyl-hexyl)p-tolylphosphate, tritolyl phosphate, bis(2-ethylhexyl)-phenyl phosphate, tri (nonylphenyl)phosphate, phenyl-methyl hydrogen phosphate, di(dodecyl)p-tolyl phosphate, tricresyl phosphate, triphenyl phosphate, isopropylated triphenyl phosphate, halogenated triphenyl phosphate, dibutylphenyl phosphate, 2-chlorethyldiphenyl phosphate, p-tolyl bis(2,5, 5'-trimethylhexyl)phosphate, 2-ethylhexyldiphenyl phosphate and the like.

Generally triphenyl phosphate, the alkylated triphenyl phosphates, including isopropylated and butylated triphenyl phosphates, bis-neopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, mixtures of these compounds and derivatives of these compounds are the most preferred phosphates.

The use of triphenyl phosphate (TPP) as a flame retardant additive for various polymer compositions is taught for example in U.S. Pat. Nos. 4,526,917 and 5,206,276. However, the use of TPP as a flame retardant additive is thought to depend on the presence of oxygen in the polymer chain or in the simultaneous use of halogen containing flame retardants (Ourgen Troitzsch, Carl Hanserverlag, "*International Plastics Flammability Handbook*'$2^{nd}$ Ed., 1990, pp47–49). As a result, TPP has been used in industry in the preparation of polycarbonates and polyethers but not significantly used for the preparation of styrenic polymer compositions.

As pointed out above, these additives are required to be used in large amounts to obtain the desired result. The use of large amounts of additive impacts on the heat deflection temperature and flow properties of the resin. Poor melt flow can impact the size and type of the part being prepared from thermoplastic resin and also further affect the equipment in which the composition is being processed.

U.S. Pat. No. 4,154,712 teaches that processability can be improved by decreasing the molecular weight of the polyphenylene ether polymers. Reduction of molecular weight of the PPE polymers however sometimes adversely affects other properties such as impact strength. It is known that in order to aid processing, flow promoters such as polystyrene, saturated polyalicyclic resins and terpene phenol can be added to the PPE resins so as to reduce viscosity and impart high flow to the resulting composition. However, the addition of polystyrene, terpene phenol and other similar flow promoters reduce the heat deflection temperature (HD0 of the product and typically increase the flammability of the PPE resin, as measured under UL94 standard protocol.

U.S. Pat. No. 5,376,724 discloses PPE compositions containing a resinous additive comprising vinyl aromatic monomers such as sytrene monomers or a hydrocarbon compound containing at least 35 wt % aromatic units which are said to improve flow of the resin composition with only minor reductions in HDT values and impact strength. U.S. Pat. No. 5,081,185 describes compositions comprising a blend of two or more polyphenylene ether resins with one resin having high intrinsic viscosity values of at least about 3.8 dl/g and the other having low intrinsic viscosity values of no greater than 0.33 dl/g. The blend of the two PPE resins exhibits higher melt flow with no substantial decrease in heat deflection temperature (HDT) when compared to the high intrinsic viscosity PPE resin of the blend.

U.S. Pat. No. 6,414,084 teaches a polyphenylene ether resin, where the PPE resin has an intrinsic viscosity of more than 0.2 dl/g as measured in chloroform at 25° C.; and a dendritic polymer with a melt viscosity in the range of 1 to 250 Pa at a temperature of 110° C. and shear rate of 30 sec$^{-1}$. The dendritic polymer is present in an amount of 30 wt % or less and is of a starburst configuration and comprises polyester branching units bound to a core.

The use of ferrocene as a flame retardant aid is taught in Linteris, G. T.; Rumminger, M. D.; Babushok, V. I.; Tsang, W. in Combustion Institute, Symposium (International) on Combustion, 28th. Proceedings. Vol 2. Jul. 20–Aug. 4, 2000, Edinburgh, Scotland, Combustion Institute, Pittsburgh, Pa., Candel, S.; Driscoll,J. F.; Burgess, A. R.; Gore, J. P., Editors, 2965–2972 pp, 2000.

Another problem of using additives such as resorcinol diphenylphosphate (RDP) and other phosphorous compounds is that the cost overruns are high. Attempts have been made to reduce the amounts of additives such as RDP by using it in combination with melamine polyphosphate or ferrocene. While the use of melamine polyphosphate (MPP) or ferrocene provide good results in terms of flowability and flame retardance, there is a significant impact on the Izod strength of the molded product. This problem is particularly acute at high levels of loading of ferrocene or MPP, which however is required to obtain good flame retardance.

As can be seen it is desirable to provide a thermoplastic resin formulations such as PPE or HIPS with high flow characteristics with reduced loadings of flow modifier to minimize the impact on HDT values, impact properties and flame retardance.

BRIEF SUMMARY

Disclosed herein is an additive blend for a flame retardant thermoplastic resin composition comprising an organo phosphate compound other than melamine polyphosphate, the additive blend comprising melamine polyphosphate; and ferrocene or an organo iron compound. In a preferred embodiment, the melamine polyphosphate is in an amount of about 0.5 to about 5 parts by weight and the ferrocene or the organo iron compound s in an amount of about 0.2 to about 5.0 parts by weight for every 100 parts by weight of resin composition.

A thermoplastic resin composition with improved flame retardance, tensile properties, flex, and heat deflection temperature comprises a thermoplastic resin; an organo phosphate compound other than melamine polyphosphate; melamine polyphosphate; and ferrocene or an organo iron compound. In one embodiment, the composition comprises less than or equal to about 20 parts by weight of the resorcinol bis(diphenyl phosphate) for every 100 parts by weight of the thermoplastic resin, wherein the melamine polyphosphate is in an amount of about 0.5 to about 5.0 parts by weight and the ferrocene or the organo ion compound is in an amount of about 0.2 to about 5.0 parts by weight based on the amount of the rescorcinol bis (diphenyl phosphate) in the composition.

A method for the manufacture of a thermoplastic resin composition extrudate improved flame retardance, flowability and heat deflection temperature performance comprises mixing a thermoplastic resin, an organo phosphate other than melamine polyphosphate, melamine polyphosphate, and ferrocene to produce a mixture; and extruding the mixture.

The above described and other features are exemplified in the following detailed description.

DETAILED DESCRIPTION

The disclosure relates to novel additive compositions for use as flame retardant aids and/or flow enhancers and/or impact modifiers for thermoplastic resin compositions. Thermoplastic resin compositions within the contemplation of the disclosure include for example, polyphenylene ether resin (PPE) compositions and styrenic polymer compositions such as HIPS as well as ABS type compositions.

The polyphenylene ether polymers (also referred to herein as "PPE") used in compositions are known polymers comprising a plurality of aryloxy repeating units preferably with at least 50 repeating units of Formula (I):

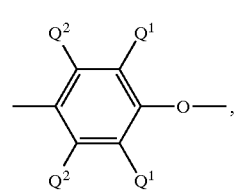

wherein in each of said units independently, each $Q^1$ is independently hydrogen, halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula (I), aminoalkyl, hydrocarbonoxy or halohydrocarbonoxy wherein at least two carbon atoms separate the halogen and oxygen atoms and at least two carbon atoms separate the halogen atoms and the phenyl nucleus of Formula (I).

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula (I), hydrocarbonoxy groups or halohydrocarbonoxy groups wherein at least two carbon atoms separate the halogen and oxygen atoms and at least two carbon atoms separate the halogen atoms from the phenyl nucleus of Formula (I). Each $Q^1$ and $Q^2$ suitably contain up to about 12 carbon atoms and most often, each $Q^1$ is an alkyl or phenyl, especially $C_1$-$C_4$ alkyl and each $Q^2$ is hydrogen.

The term "polyphenylene ether resin," as used in the specification and claims herein, includes unsubstituted polyphenylene ether polymers, substituted polyphenylene ether polymers wherein the aromatic ring is substituted, polyphenylene ether copolymers and blends thereof. Also included are polyphenylene ether polymers containing moieties prepared by grafting onto the polyphenylene ether in a known manner such materials as vinyl monomers or polymers such a polystyrenes and elastomers, as described in U.S. Pat. No. 5,089,566 issued to S. Bruce Brown. Coupled polyphenylene ether polymers in which coupling agents such as low molecular weight polycarbonates, quinones, heterocycles and formals undergo reaction in the known manner with the hydroxy groups of two phenyl ether chains to produce a high molecular weight polymer are also included.

The polyphenylene ether polymers used in the compositions may also have various end groups such as amino alkyl containing end groups and 4-hydroxy biphenyl end groups, typically incorporated during synthesis by the oxidative coupling reaction. The polyphenylene ether polymers may be functionalized or "capped" with end groups, which add further reactivity to the polymer and in some instances provide additional compatibility with other polymer systems that may be used in conjunction with the polyphenylene ether polymers to produce an alloy or blend. For instance, the polyphenylene ether polymer may be functionalized with an epoxy end group, a phosphate end group or ortho ester end group by reacting a functionalizing agent such as 2-chloro-4(2-diethylphosphato epoxy)6-(2,4,6-trimethylphenoxy)-1,3,5-trizene, with one of the end groups of the polyphenylene ether polymer, i.e., one of the terminal hydroxyl groups.

It will be apparent to those skilled in the art from the foregoing that the polyphenylene ether polymers contemplated for use include all of those presently known, irrespective of the variations in structural units.

Suitable polyphenylene ether polymers useful include but are not limited to poly(2,6-dimethyl-1,4-phenylene ether); poly(2,3,6-trimethyl-1,4-phenylene)ether; poly(2,6-diethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4 phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2-ethoxy-1,4-phenylene)ether; poly(2-chloro-1,4-phenylene)ether; poly(2,6-dibromo-1,4-phenylene)ether; poly(3-bromo-2,6-dimethyl-1,4-phenylene)ether; mixtures thereof, and the like.

Suitable copolymers include random copolymers containing 2,6-dimethyl-1,4-phenylene ether units and 2,3,6-trimethyl-1,4-phenylene ether units.

The polyphenylene ether resins employed in the compositions of this invention have an intrinsic viscosity greater than about 0.2 dl/g, as measured in chloroform at 25° C., and generally have a number average molecular weight within the range of about 3,000 to 40,000 and a weight average molecular weight in the range of 20,000 to 80,000, as determined by gel permeation chromatography.

The polyphenylether ether polymers suitable for use in this invention may be prepared by any of a number of processes known in the art from corresponding phenols or reactive derivatives thereof. Polyphenylene ether resins are typically prepared by the oxidative coupling of at least one monohydroxy aromatic compound such as 2,6-xylenol or 2,3,6-trimethylphenol. Catalysts systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide) ions and at least one amine such as cuprous chloride- trimethylamine. Catalyst systems which contain manganese compounds are generally alkaline systems in which divalent manganese is combined with such anions as halide, alkoxide or phenoxide. Most often, the manganese is present as a complex with one or more complexing and/or chelating agents such as dialkylamines, alkylenediamines, o-hydroxy aromatic aldehydes, o-hydroxyazo compounds and o-hydroxyaryl oximes. Examples of manganese containing catalysts include manganese chloride-and manganese chloride-sodium methylate. Suitable cobalt type catalyst systems contain cobalt salts and an amine.

Examples of catalyst systems and methods for preparing polyphenylether resins are set forth in U.S. Pat. Nos. 3,306,874, 3,306,875, 3,914,266 and 4,028,341 (Hay); U.S. Pat. Nos. 3,257,357 and 3,257,358 (Stamatoff); U.S. Pat. Nos. 4,935,472 and 4,806,297 (S. B. Brown et al.); and U.S. Pat. No. 4,806,602 issued to Dwayne M. White et al.

In general, the molecular weight of the polyphenylene ether resins can be controlled by controlling the reaction time, the reaction temperature, and the amount of catalyst. Longer reaction times will provide a higher average number of repeating units and a higher intrinsic viscosity. At some point, a desired molecular weight (intrinsic viscosity) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like or the product may be separated from the catalyst by filtration, precipitation or other suitable means as taught by Hay in U.S. Pat. No. 3,306,875. The PPE preferably comprises a compatibilized or functionalized PPE, wherein compatibility is meant to include the minimization of gross phase separation between the of the blend (i.e., the PPE and any other ingredients of the blend). Increased tensile elongation, reduced delamination tendency, increased ductility and improved phase morphology stabilization are generally indicators of improved compatibilization. The desirable physical properties of the blend are determined partly by the improvement in the compatibilization between the blend components.

The PPE preferably comprises a compatibilized or functionalized PPE, wherein compatibility is meant to include the minimization of gross phase separation between the components of the blend (i.e., the PPE and any other ingredients of the blend). Increased tensile elongation, reduced delamination tendency, increased ductility and improved phase morphology stabilization are generally indicators of improved compatibilization. The desirable physical properties of the blend are determined partly by the improvement in the compatibilization between the blend components.

Styrenic polymer compositions are prepared from one or more monoalkenyl aromatic compounds. Representative monoalkenyl aromatic compounds include styrene, alkyl substituted styrenes such as alpha-alkyl-styrenes, and ring substituted styrenes. Examples of alpha-alkyl-styrenes include alpha-methyl styrene and alpha-ethyl-styrene, while examples of ring substituted styrenes include o-ethyl-styrene, 2,4-dimethyl-styrene and vinyltoluene, such as p-vinyltoluene, vinyl anthracene, and mixtures thereof. The polymer matrix preferably utilizes styrene and/or alpha-methyl styrene as the monoalkenyl aromatic monomer, with styrene being the most preferred monoalkenyl aromatic compound. One or more additional co-monomers such as unsaturated nitriles, for example acrylonitrile, can also be included in the polymerizable monomer mixture.

While the thermoplastic resins described above are of wide utility in several applications due to their excellent chemical and mechanical properties, it is often necessary to add flame retardant aids to improve such performance. As explained in the section on background to the disclosure, it is important to utilize flame retardant additives in reduced amounts such that all properties such as flowability, heat deflection temperature and flame retardance of the thermoplastic resin are preserved or enhanced.

The compositions of the present invention also comprise at least one flame retardant, generally an organic phosphate. The organic phosphate is preferably an aromatic phosphate compound of the formula:

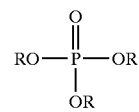

wherein R is the same or different and is an alkyl, cycloalkyl, aryl, alkyl substituted aryl, halogen substituted alkyl, aryl substituted alkyl, halogen, or a combination of any of the foregoing, provided at least one R is aryl.

Examples include phenyl bisdodecyl phosphate, phenyl-bisneopentyl phosphate, phenyl-bis(3,5,5'-tri-methyl-hexyl phosphate), ethyldiphenyl phosphate, 2-ethyl-hexyldi(p-tolyl)phosphate, bis-(2-ethylhexyl) p- tolylphosphate, tritolyl phosphate, bis-(2-ethylhexyl)phenyl phosphate, tri-(nonylphenyl)phosphate, di(dodecyl) p-tolyl phosphate, tricresyl phosphate, triphenyl phosphate, dibutylphenyl phosphate, 2- chloroethyidiphenyl phosphate, p-tolyl bis(2, 5,5'-trimethylhexyl)phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having one or a mixture of the following formulas:

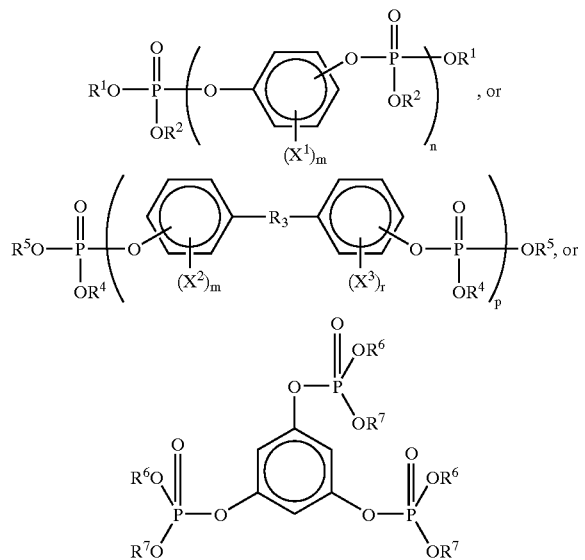

wherein $R^1$, $R^2$, $R^3$, $R^4$, $R^5$, $R^6$, and $R^7$ are independently, a hydrocarbon of C1 to C20, aryl, or alkyl- substituted aryl; $X^1$, $X^2$, and $X^3$ are halogen; m and r are 0 or integers from 1 to 4, and n and p are from 1 to 30. When m and/or r are 0, the aromatic rings preferably contain hydrogen without halogen substitution.

Examples include the (tetraphenyl)bisphosphates of resorcinol, hydroquinone and bisphenol-A, respectively, or their polymeric counterparts. Methods for the preparation of the aforementioned di- and polyfunctional aromatic phosphates are described in British Patent No. 2, 043,083.

Another development is the use of certain cyclic phosphates, for example, diphenyl pentaerythritol diphosphate, as a flame retardant agent for polyphenylene ether resins, as is described by Axelrod in U.S. Pat. No. 4,254,775.

Other suitable flame-retardant additives include compounds containing phosphorus -nitrogen bonds, such as phosphonitrilic chloride, phosphorus ester amides, phosphoric acid amides, phosphonic acid amides, phosphinic acid amides, tris(aziridinyl)phosphine oxide, or tetrakis (hydroxymethyl)phosphonium chloride. These flame-retardant additives are commercially available.

Preferred phosphate flame retardants include those based upon resorcinol such as, for example, resorcinol bis(dipheny phosphate), as well as those based upon bis-phenols such as, for example, bis-phenol A tetraphenyl diphosphate. Phosphates containing substituted phenyl groups are also preferred. In an especially preferred embodiment, the organo-phosphate is selected from the group consisting of resorcinol bis( diphenyl phosphate), bis-phenol A bis(diphenyl phosphate), and mixtures containing at least one of the foregoing.

In combination with the phosphate compound, the compositions preferably include ferrocene or ferrocene derivatives. Suitable ferrocene derivatives are the di-π cyclopentadieneyl iron complexes represented by the following formula.

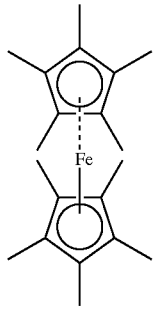

Various substituents may be pendant on the cyclopentadienyl ring. Representatives of these compounds are di-π-cyclopentadienyl iron (ferrocene), bis-indenyl-iron (II) (dibenzferrocene), 1,1'- diacetylferrocene, 1,2 diacetylferrocene, 1,1-diferroceneylethane, dimethylaminoethylferrocene, methylamino methyl-ferrocene, ferrocenylacetonitrile, ferrocenylcarbonal, ferrocene-sulfonic acid, 1,2 di-ferrocenylethane, di-ferrocenylmethane, phenylferrocene, ferrocenecarboxaldhyde, the Ω-ferrocenyl aliphatic acids, phenylcyclopentaferrocene, 1,1'(-1,3-cyclopenylene) ferrocene phenylcyclopentylferrocene and like compounds, benzoylferrocene, acetylferrocene. Also heterocyclic π complexes such as azaferrocene may be utilized. While not wanting to be bound by theory, a feature of the ferrocenes that is believed to enhance the flame retardant characteristics of polymer compositions is the presence of the following structure within the molecule.

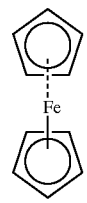

Since ferrocene is aromatic, it can undergo aromatic substitution reactions such as Friedel-Crafts acylation, alkylation, sulfonation, and aminomethylation, providing a wide range of ferrocene compounds and derivatives. Preferably, the ferrocene derivatives do not degrade the polymer resins in which they are incorporated. Other suitable organo iron compounds include iron(II) acetylacetonate, iron imidazolyl and benzimidazolyl.

The present disclosure is based on the surprising recognition that the use of select amounts of both melamine polyphosphate and ferrocene, in combination, not only enables a reduction in the amount of RDP, but also improves the flame retardance and significantly improves the flex, tensile properties, and heat deflection temperature of the thermoplastic resin composition.

The additive composition preferably comprises for every 100 parts by weight of thermoplastic composition about 0.5 to about 5.0 parts of melamine polyphosphate and about 0.2 to about 5.0 parts of ferrocene or an organo iron compound. More preferably, the additive composition comprises for every 12 parts of resorcinol diphenyl phosphate in the thermoplastic composition about 0.5 to about 5.0 parts of melamine polyphosphate and about 0.2 to about 5.0 parts of ferrocene or an organo iron compound. More preferably, the additive composition comprises for every 12 parts of resorcinol diphenyl phosphate, 0.5 parts of melamine polyphosphate and 0.2 parts of ferrocene or an organo iron compound, more preferably 0.5 parts of ferrocene or an organo iron compound to every 0.5 parts of melamine polyphosphate. The additive composition can also comprise for every 12 parts of RDP, 1.0 parts of MPP and 0.2 parts of ferrocene or an organo iron compound, more preferably 0.5 parts of ferrocene or an organo iron compound to every 1.0 parts of MPP.

Without wishing to be bound by any theory, it is believed that the ferrocene and MPP work both by condensed phase and vapor phase mechanisms. Ferrocene is to catalyze C—C coupling reactions and thus help in cross linking and reduction of fuel generation. Prior art literature teaches that metallocenes are effective catalysts in olefin polymerisation. Therefore, it is also believed that ferrocene could be reducing fuel generation by catalyzing repolymerisation of olefinic residues released from styrenic polymers such as HIPS.

The thermoplastic resin composition may also comprise effective amounts of at least one other additive selected from the group consisting of drip retardants, dyes, pigments, additional flow enhancers, impact modifiers, colorants, reinforcing agents, fillers, glass fibers, stabilizers, antistatic agents, plasticizers and lubricants.

The thermoplastic resin composition of the disclosure is generally prepared by blending the ingredients under conditions appropriate to obtain an intimate blend. The blending can be done using a single or a twin screw type extruder or any mixing device capable of applying a shear to the components. All ingredients may be added initially to the processing system.

The thermoplastic compositions of the disclosure may also be prepared using separate extruders in the processing or using a single extruder with multiple feed ports enabling the addition of multiple components during processing. It is preferable to employ at least one vent port in each section between the feed ports to allow venting (either atmospheric or vacuum) of the melt. Volatile impurities in the blend composition for example, can be removed by applying a vacuum to the melt through a vent port provided in the mixing device. Blending times and temperatures, as well as component addition can be adjusted by those skilled in the art without undue experimentation. Molded articles prepared from the compositions of the present disclosure also represent another embodiment of the disclosure.

The following examples are provided to illustrate some embodiments of the present disclosure. They are not intended to limit the disclosure in any aspect. All percentages are by weight based on the total weight of the entire composition, unless otherwise indicated and all parts are parts by weight.

EXAMPLE 1

A first control resin formulation was prepared by intimately blending polyphenylene ether resin with resorcinol diphenylphosphate (RDP) as additive in an amount of 16 parts of RDP for every 100 parts by weight of the polyphenylene ether resin. The polyphenylene ether resin was Noryl 190 X available from the General Electric Company.

A portion of the first control resin formulation was taken and extruded in a GEP Selkirk 53 mm Twin Screw, W&P extruder at a feed rate of 300 pounds per hour, at a screw speed of 270 rpm, and at 72% torque. The extrudate was the tested for flame retardance, Izod impact, flow, flex and heat deflection temperature. The values obtained are given in Table 1 below. Details of the test procedures follows Table 1.

EXAMPLE 2

A second control resin formulation was prepared by intimately blending the Noryl 190 X polyphenylene ether resin with RDP as an additive in an amount of 12 parts of RDP for every 100 parts by weight of polyphenylene ether resin.

A portion of the second control resin formulation was taken and extruded in a GEP Selkirk 53 mm Twin Screw, W&P extruder at a feed rate of 300 pounds per hour, at a screw speed of 270 rpm and 72% torque. The extrudate was the tested for flame retardance, Izod impact, flow, flex and heat deflection temperature. The values obtained are given in Table 1 below.

EXAMPLE 3

An additive composition was prepared by intimately blending melamine polyphosphate (MPP) and ferrocene into a portion of the first control resin formulation (prepared in Example 1) such that the amount of MPP is 0.5 parts by weight and ferrocene is 0.2 parts by weight for every 100 parts by weight of the polyphenylene ether resin. Thus, for every 16 parts of RDP in the formulation, the amount of MPP is 0.5 parts by weight and ferrocene is 0.2 parts by weight.

The formulation so obtained was extruded under the same conditions as in Example 1. The extrudate was the tested for flame retardance, Izod impact, flow, flex and heat deflection temperature. The values obtained are given in Table 1 below.

EXAMPLE 4

An additive composition was prepared by intimately blending MPP and ferrocene into a portion of the second control resin formulation (prepared in Example 2) such that the amount of MPP is 0.5 parts by weight and ferrocene is 0.5 parts by weight for every 100 parts of the polyphenylene ether resin. Thus, for every 12 parts of RDP in the formulation, the amount of MPP is 0.5 parts by weight and ferrocene is 0.5 parts by weight.

The resin formulation so obtained was extruded under the same conditions as in Example 1. The extrudate was the tested for flame retardance, Izod impact, flow, flex and heat deflection temperature. The values obtained are given in Table 1 below.

EXAMPLE 5

An additive composition was prepared by intimately blending melamine polyphosphate (MPP) and ferrocene into a portion of the second control resin formulation (prepared in Example 2) such that the amount of MPP is 1.0 parts by weight and ferrocene is 0.2 parts by weight for every 100 parts of the polyphenylene ether resin. Thus, for every 12 parts of RDP in the formulation, the amount of MPP is 1.0 parts by weight and ferrocene is 0.2 parts by weight.

The resin formulation so obtained was extruded under the same conditions as in Example 1. The extrudate was the tested for flame retardance, Izod impact, flow, flex and heat deflection temperature. The values obtained are given in Table 1 below.

EXAMPLE 6

An additive composition was prepared by intimately blending MPP and ferrocene into a portion of the second control resin formulation (as prepared in Example 2) such that the amount of MPP is 1.0 parts by weight and ferrocene is 0.5 parts by weight for every 100 parts of the polyphenylene ether resin. Thus, for every 12 parts of RDP in the thermoplastic resin formulation, the amount of MPP is 1.0 parts by weight and ferrocene is 0.5 parts by weight.

The resin formulation so obtained was extruded under the same conditions as in Example 1. The extrudate was the tested for flame retardance, Izod impact, flow, flex and heat deflection temperature. The values obtained are given in Table 1 below.

TABLE 1

| Example | Average Flame out time (seconds) | Izod impact (ft lb/in) | Flex Modulus (psi) | Flex Strength (psi) | Flow at 1,500/s (Pa-s) | Heat deflection temperature (° F.) | Tensile % elongation |
|---|---|---|---|---|---|---|---|
| 1* | 2.99 | 4.67 | 344,500 | 12,810 | 181.2 | 188.5 | 19.06 |
| 2* | 4.21 | 4.84 | 357,800 | 13,410 | 223.6 | 205.7 | 18.41 |
| 3 | 2.8 | 3.38 | 361,600 | 13,400 | 226.0 | 204.9 | 23.94 |
| 4 | 1.92 | 2.65 | 361,200 | 13,430 | 226.5 | 202.2 | 23.61 |
| 5 | 2.09 | 2.09 | 361,100 | 13,430 | 230.6 | 205.7 | 22.81 |
| 6 | 1.68 | 2.00 | 362,200 | 13,500 | 230.3 | 206.8 | 23.51 |

*control

As shown in Table 1, a comparison of control examples 1 and 2 (containing no MPP and ferrocene) with examples 3–6 (containing MPP and ferrocene) indicates that flame retardancy is improved while maintaining other properties for the compositions, i.e., Izod impact strength, flexural modulus, flex strength, flowability, heat deflection and tensile % elongation.

EXAMPLE 7

In this example, the formulations obtained in Examples 3 and 5 were subjected to iron analysis by inductively coupled plasma (ICP). Against an expected iron purity of 0.060% (based on 98% purity), the iron obtained by ICP analysis is expected to be ~0.057%. Thus, the iron loss during extrusion is only ~5%. The actual values of iron obtained from the samples ranged from 0.054 to 0.0599%. The ICP analysis error is ±5%.

Tests for flame retardancy were performed according to UL-94 protocol for a VO rating using test bars of the thermoplastic resin formulations.

The compositions made in the above examples were tested for flammability using a flame retardant testing tool, which provides a prediction of the likelihood that a particular UL standard, such as UL-94 will be passed. The UL-94 protocol calls for bar-shaped specimens of dimensions 5"(12.7 cm)×½"(1.3 cm), 1.6 mm thickness, UL-94 ratings being specified for the thickness. A flame having an inner cone of height ¾"(1.9 cm) is applied to each specimen so that a distance of ⅜"(1.0 cm) separates the lower end of the specimen from base of the flame. The flame is held in that position for 10 seconds and then removed. A burn time is defined as the time required for the flame issuing from the specimen to disappear. If burning of the specimen ceases within 30 seconds, the flame is reapplied for an additional 10 seconds. The criteria for V-0, V-1, and V-2 ratings are listed below in Table 2.

TABLE 2

| Vertical Flame Class Requirements | | | |
|---|---|---|---|
|  | 94 V-0 | 94 V-1 | 94 V-2 |
| Individual burn time (seconds) | ≦10 | ≦30 | ≦30 |
| Total burn time (seconds) (5 specimens) | ≦50 | ≦250 | ≦250 |

TABLE 2-continued

| Vertical Flame Class Requirements | | | |
|---|---|---|---|
|  | 94 V-0 | 94 V-1 | 94 V-2 |
| Glowing time (seconds) (individual specimen) | ≦30 | ≦60 | ≦60 |
| Drip particles that ignite cotton | NO | NO | YES |

For a V-0 rating, no individual burn times, from the first or second application may exceed 10 seconds. The total of the burn times for any five specimens may not exceed 50 seconds. Drip particles that ignite a piece of cotton gauze situated below the specimen are not allowed.

For a V-1 rating, no individual burn times, from the first or second application may exceed 30 seconds. The total of the burn times for any five specimens may not exceed 250 seconds. Drip particles that ignite a piece of cotton gauze situated below the specimen are not allowed.

For a V-2 rating, no individual burn times, from the first or second application may exceed 30 seconds. The total of the burn times for any five specimens may not exceed 250 seconds. Drip particles that ignite a piece of cotton gauze situated below the specimen are allowed.

Heat deflection temperatures were determined by a test procedure based on ASTM D-648.

Notched Izod tests were performed by a test procedure based on ASTM D-256. The results of the test are reported in terms of energy absorbed per unit of specimen width and expressed as foot times pounds per inch (ft.lbs/in.).

Shear viscosity (i.e., flow) was measured at each shear rate using a Kayeness capillary rheometer.

Advantageously, adding both MPP and ferrocene (or an organo ion compound) to a thermoplastic formulation containing RDP as a flame retardant provides increased flame retardancy to the thermoplastic resin formulation compared to formulations that did not contain the additive combination of MPP and ferrocene. Surprisingly, the use of effective amounts of ferrocene(or an organo ion compound) and MPP used in the combination does not impair the Izod impact of the formulation. Moreover, the flex and flow rate of the resin formulation is also not impaired. It is also noted that the heat deflection temperature profile of the resin formulation is not impaired by the use of MPP and ferrocene (or an organo ion compound) as co-additives with RDP.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An additive blend comprising:
   melamine polyphosphate; and
   ferrocene or an organo iron compound, wherein the additive compound is used with thermoplastic compositions comprising an organophosphate compound other than melamine polyphosphate.

2. The additive blend of claim 1, wherein the melamine polyphosphate is in an amount of about 0.5 to about 5.0 parts by weight and the ferrocene or the organo iron compound is in an amount of about 0.2 to about 5.0 parts by weight for every 100 parts by weight of resin composition.

3. The additive blend of claim 1, wherein the organo iron compound is selected from the group consisting of iron acetylacetonate, iron imidazolyl, iron benzimnidazolyl, di-π-cyclopentadienyl iron(fexrocene), bis-indenyl-iron (II) (dibenzfeirocene), 1,1'- diacctylferrorene, 1,2 diacetylferrocene, 1,1-diferroceneylithane, dinethylaninoethylferrocene, methylamino methyl-fercene, ferrocenylacetonitrile, ferrocenylcarbonal, ferrocene-sulfonic acid, 1,2 di-ferrocenylethane, di-ferrocenylmethane, phenylferrocene, ferrocenecarboxaldhyde, the Ω-ferrocenyl aliphatic acids, phenylcyclopentaferrocene, 1,1 '(-1,3-cyclopenylene)ferrocene phenylcyclopedtylferrocene, benzoylferrocene, acetylferiocene and azaferrocene.

4. A thermoplastic resin composition with improved flame retardance, tensile properties, flex, and heat deflection temperature, the composition comprising:
   a thermoplastic resin;
   an organo phosphate compound other than melamine polyphosphate;
   melamine polyphosphate; and
   ferrocene or an organo iron compound.

5. The thermoplastic resin composition of claim 4, wherein the composition comprises less than or equal to about 20 parts by weight of the organic phosphate compound for every 100 parts by weight of the thermoplastic resin, wherein the melamine polyphosphate is in an amount of about 0.5 to about 5.0 parts by weight and the ferrocene or the organo iron compound is in an amount of about 0.2 to about 5.0 parts by weight based on the amount of the organo phosphate compound.

6. The thermoplastic resin composition of claim 4, wherein the organo iron compound is selected from the group consisting of iron acetlacetonate, iron imidazolyl , iron benzinidazolyl, di-π-cyclopentadienyl iron (ferrocene), bis-indenyl-iron(II) (dibenzferrocene), 1,1'-diacetylferrocene, 1,2 diacetylferrocren, 1,1-diferroceneylethane, dimethylaminoethylferrocene, methylamino methyl-ferrocene, ferrocenylacetonitrile, ferrocenylcarbonal, ferrocene-sulfonic acid, 1,2 di-ferrocenylethane, di-ferrocenylmethane, phenylfeffocene, ferrocenecarboxaldhyde, the Ω-ferrocenyl aliphatic acids, phenylcyclopentaferrocene, 1,1'(-1,3-cyclopenylene)ferrocene phenylcyclopentylferrocene, benzoylferrocene, acetylferrocene and azaferrocene.

7. The thermoplastic resin composition of claim 4, wherein the organo phosphate has the formula:

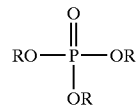

wherein R is the same or different and is an alkyl, cycloalkyl, aryl, alkyl substituted aryl, halogen substituted alky, aryl substituted alkyl, halogen, or a combination of any of the foregoing, provided at least one R is aryl.

8. The thermoplastic resin composition of claim 4, wherein the organo phosphate compound is of a formula selected from the group consisting of:

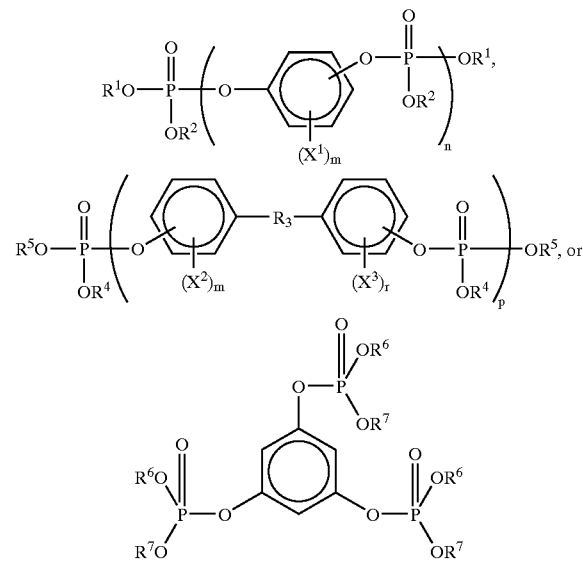

wherein $R^1$, $R^2$, $R^3$, $R^4$, $R^5$, $R^6$, and $R^7$ are independently, a hydrocarbon of $C_1$ to $C_{20}$, an aryl, an alkyl-substituted aryl; $X^1$, $X^2$, and $X^3$ are halogen; m and r are 0 or integers from 1 to 4, and n and p are from 1 to 30, and wherein when m and/or r are 0, the aromatic rings contain hydrogen without halogen substitution.

9. The thermoplastic resin composition of claim 4, wherein the organo phosphate compound is selected from the group consisting of resorcinol bis(diphenyl phosphate) and bisphenol A bis(diphenyl phosphate).

10. The thermoplastic resin composition of claim 4, further comprising effective amounts of at least one additive selected from the group consisting of drip retardants, dyes, pigments, flow enhancers, inpact modifiers, colorants, reinforcing agents, fillers, glass fibers, stabilizers, antistatic agents, plasticizers and lubricant.

11. The thermoplastic resin composition of claim 4, wherein the thermoplastic resin comprises a polyphenylene ether resin, an acrylonitrile/butadienestyrene rubber, or a styrenic polymer composition.

12. The thermoplastic resin composition of claim 11, wherein the thermoplastic resin is a polyphenytene ether resin.

13. The thermoplastic resin composition of claim 11, wherein the styrenic polymer composition is a high impact polystyrene.

14. The thermoplastic resin composition of claim 11, wherein the styrenic polymer composition comprises a homopolymer or copolymer of a monoalkenyl aromatic compound.

15. The thermoplastic resin composition of claim 14, wherein the monoalkenyl aromatic compound is selected from the group consisting of styrene, alkyl substituted styrenes, ring substituted styrenes, and mixtures thereof.

16. The thermoplastic resin composition of claim 15, wherein the alkyl substituted styrene comprises an alpha-alkyl-styrene selected from alpha-methyl styrene, alpha-ethyl-styrene and a mixture thereof.

17. The thermoplastic resin composition of claim 15, wherein the ring substituted styrene is selected from the group consisting of o-ethyl-styrene. 2,4-dimethyl-styrene, p-vinyltoluene, vinyl anthracene, and mixtures thereof.

18. A method for the manufacture of a thermoplastic resin composition extrudate with improved flame retardance, flowability and heat deflection temperature performance, said method comprising:

mixing a thermoplastic resin, an organo phosphate compound other than melamine polyphosphate, melamine polyphosphate, and ferrocene or an organo iron compound to produce a mixture; and extruding the mixture.

19. The method of claim 18, wherein the mixture comprises less than or equal to about 20 parts by weight of the organo phosphate for every 100 parts by weight of the thermoplastic resin, wherein the melamine polyphosphate is in an amount of about 0.5 to about 5.0 parts by weight and the ferrocene is in an amount of about 0.2 to about 5.0 parts by weight based on the amount of the organo phosphate in the composition.

20. The method of claim 18, wherein the thermoplastic resin comprises a polyphenylene ether resin, an acrylonitrile/butadienestyrene rubber, or a styrenic polymer composition.

21. The method of claim 18, wherein the organo phosphate has the formula:

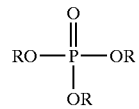

wherein R is the same or different and is an alkyl, cycloalkyl, aryl, alkyl substituted aryl, halogen substituted alkyl, aryl substituted alkyl, halogen, or a combination of any of the foregoing, provided at least one R is aryl.

22. The method of claim 18, wherein the organo phosphate compound is selected from the group consisting of resorcinol bis(diphenyl phosphate and bisphenol A bis (diphenyl phosphate).

23. The method of claim 18, wherein the organo phosphate compound is of a formula selected from the group consisting of:

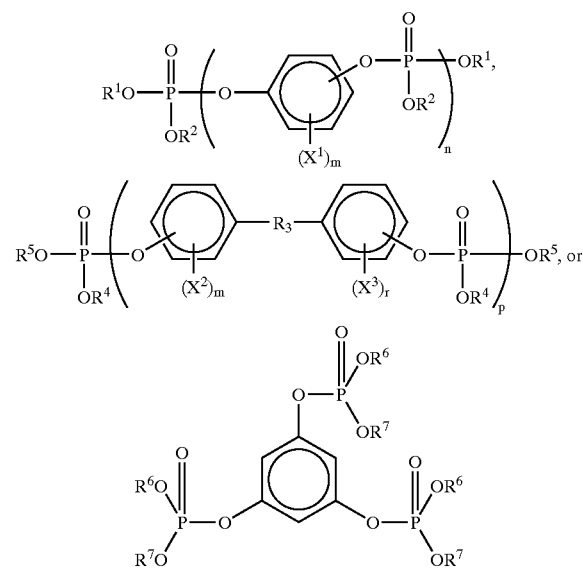

wherein $R^1$, $R^2$, $R^3$, $R^4$, $R^5$, $R^6$, and $R^7$ are independently, a hydrocarbon of $C_1$ to $C_{20}$ an aryl, an alkyl-substituted aryl; $X^1$, $X^2$, and $X^3$ are halogen; m and r are 0 or integers from 1 to 4, and n and p are from 1 to 30, and wherein when m and/or r are 0, the aromatic rings contain hydrogen without halogen substitution.

24. The method of claim 18, further comprising incorporating effective amounts of at least one other additive selected from the group consisting of drip retardants, dyes, pigments, flow enhancers, impact modifiers, colorants, reinforcing agents, fillers, glass fibers, stabilizers, antistatic agents, plasticizers and lubricants, in the blend during processing.

* * * * *

UNITED STATES PATENT AND TRADEMARK OFFICE
CERTIFICATE OF CORRECTION

PATENT NO. : 6,689,825 B1
APPLICATION NO. : 10/065886
DATED : February 10, 2004
INVENTOR(S) : Chandra S. Bajgur et al.

It is certified that error appears in the above-identified patent and that said Letters Patent is hereby corrected as shown below:

Title Page,
Item (73) Assignee, delete "Pittsfield, MA", and insert therefor --Schenectady, NY--.

Title Page,
(56) References Cited, Other Publications, after "inhibition by" delete "Ferrocence" and insert therefor --Ferrocene--.

Column 1,
Line 11, after "resins" insert --,--

Column 1,
Line 65, after "disadvantage" delete "of" and insert therefor --or--

Column 4,
Line 6, after "Flammability" delete "Handbook'$2^{nd}$" and insert therefor --Handbook"$2^{nd}$--

Column 5,
Line 22, after "iron" delete "compound s" and insert therefor --compounds--.

Column 6,
Line 39, after "manner" insert --using--

Column 6,
Line 40, after "such", delete "a" and insert therefor --as--.

Column 7,
Line 1, after "polymers", delete "useful" and insert therefor --usually--

Column 7,
Line 66, after "metal", delete "catalysts" and insert therefor --catalyst--.

Column 8,
Line 7, after "separation" delete "between the".

Column 9,
Line 4, after "phosphate" (first occurrence) delete "2-chloroethyidiphenyl" and insert therefor --2-chloroethyldiphenyl --.

UNITED STATES PATENT AND TRADEMARK OFFICE
CERTIFICATE OF CORRECTION

PATENT NO. : 6,689,825 B1
APPLICATION NO. : 10/065886
DATED : February 10, 2004
INVENTOR(S) : Chandra S. Bajgur et al.

It is certified that error appears in the above-identified patent and that said Letters Patent is hereby corrected as shown below:

Column 10,
Line 30, after "1, 1,'" delete (-1,3-cyclopenylene) and insert therefor --(-1,3-cyclopentylene)--.

Column 12,
Line 1, after "was", delete "the" and insert therefor --then--

Column 12,
Line 16, before "tested", delete "the" and insert therefor --then--

Column 12,
Line 31, after "was" delete "the" and insert therefor --then--

Column 12,
Line 45, after "was" delete "the" and insert therefor --then--

Column 12,
Line 60, after "was" delete "the" and insert therefor --then--

Column 13
Line 8, after "was" delete "the" and insert therefor --then--

Column 15,
Line 35, after "iron" (first occurrence) delete "(fexrocene)" and insert therefor --(ferrocene)--

Column 15,
Line 36, before "1,1'-diacctylferrorene", delete "dibenzfeirocene" and insert therefor --dibenzferrocene--

Column 15,
Line 36, after "1,1'-" delete "diacctylferrorene" and insert therefor --diacetylferrocene--.

Column 15,
Line 37, after "1,1-", delete "diferroceneylithane" and insert therefor --diferrocenylethane--

Column 15,
Line 38, before "methylamino", delete "dinethylaninoethylferrocene" and insert therefor --dimethylaminoethylferrocene--.

UNITED STATES PATENT AND TRADEMARK OFFICE
CERTIFICATE OF CORRECTION

PATENT NO.      : 6,689,825 B1
APPLICATION NO. : 10/065886
DATED           : February 10, 2004
INVENTOR(S)     : Chandra S. Bajgur et al.

It is certified that error appears in the above-identified patent and that said Letters Patent is hereby corrected as shown below:

Column 15,
Line 38, after "methyl-" delete "fercene" and insert therefor --ferrocene--

Column 15,
Line 42, before "the" delete "ferrocenecarboxaldhyde" and insert therefor --ferrocenecarboxaldehyde--

Column 15,
Line 43, after "phenylcyclopentaferrocene" delete "1,1 '(-1,3-cyclopenylene)" and insert therefor -- 1,1' (-1,3-cyclopentylene) --

Column 15,
Line 44, after "ferrocene" delete "phenylcyclopedtylferrocene" and insert therefor --phenylcyclopentylferrocene--

Column 15,
Line 45, before "and" delete "acetylferiocene" and insert therefor --acetylferrocene--

Column 15,
Line 66, after "iron" (first occurrence) delete "acetlacetonate," and insert therefor --acetylacetonate--

Column 15,
Line 67, after "iron" (first occurrence) delete "benzinidazolyl" and insert therefor --benzimidazolyl--.

Column 16,
Line 2, after "diacetylferrocene," delete "1,2 diacetylferrocren" and insert therefor -- 1,2 diacetylferrocene --

Column 16,
Line 3, before "dimethylaminoethylferrocene", delete "diferroceneylethane" and insert therefor --diferrocenylethane--

Column 16,
Line 7, before "the", delete "phenylfeffocene, ferrocenecarboxaldhyde," and insert therefor --phenylferrocene, ferrocenecarboxaldehyde,--.

UNITED STATES PATENT AND TRADEMARK OFFICE
CERTIFICATE OF CORRECTION

PATENT NO. : 6,689,825 B1
APPLICATION NO. : 10/065886
DATED : February 10, 2004
INVENTOR(S) : Chandra S. Bajgur et al.

It is certified that error appears in the above-identified patent and that said Letters Patent is hereby corrected as shown below:

Column 16,
Line 9, before "ferrocene" delete "cyclopenylene)" and insert therefor --cyclopentylene)--.

Column 17,
Line 4, after "is a", delete "polyphenytene" and insert therefor --polyphenylene--.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,689,825 B1 |
| APPLICATION NO. | : 10/065886 |
| DATED | : February 10, 2004 |
| INVENTOR(S) | : Chandra S. Bajgur et al. |

It is certified that error appears in the above-identified patent and that said Letters Patent is hereby corrected as shown below:

Title Page,
Item (73) Assignee, delete "Pittsfield, MA", and insert therefor --Schenectady, NY--.

Title Page,
(56) References Cited, Other Publications, after "inhibition by" delete "Ferrocence" and insert therefor --Ferrocene--.

Column 1,
Line 11, after "resins" insert --,--
Line 20, after "polystyrene" delete "(IIIPS) and insert therefore -- (HIPS) --.

Column 1,
Line 65, after "disadvantage" delete "of" and insert therefor --or--

Column 4,
Line 6, after "Flammability" delete "Handbook'2$^{nd}$" and insert therefor --Handbook"2$^{nd}$--
Line 28, after "temperature" delete "(HD0)" and insert therefore -- (HDT) --.

Column 5,
Line 22, after "iron" delete "compound s" and insert therefor --compounds--.

Column 6,
Line 39, after "manner" insert --using--

Column 6,
Line 40, after "such", delete "a" and insert therefor --as--.

Column 7,
Line 1, after "polymers", delete "useful" and insert therefor --usually--

Column 7,
Line 66, after "metal", delete "catalysts" and insert therefor --catalyst--.

Column 8,
Line 7, after "separation" delete "between the".

Column 9,
Line 4, after "phosphate" (first occurrence) delete "2-chloroethyidiphenyl" and insert therefor --2-chloroethyldiphenyl --.

UNITED STATES PATENT AND TRADEMARK OFFICE
CERTIFICATE OF CORRECTION

PATENT NO.        : 6,689,825 B1
APPLICATION NO.   : 10/065886
DATED             : February 10, 2004
INVENTOR(S)       : Chandra S. Bajgur et al.

It is certified that error appears in the above-identified patent and that said Letters Patent is hereby corrected as shown below:

Column 10,
Line 30, after "1, 1,'" delete "(-1,3-cyclopenylene)" and insert therefor --(-1,3-cyclopentylene)--.

Column 12,
Line 1, after "was", delete "the" and insert therefor --then--

Column 12,
Line 16, before "tested", delete "the" and insert therefor --then--

Column 12,
Line 31, after "was" delete "the" and insert therefor --then--

Column 12,
Line 45, after "was" delete "the" and insert therefor --then--

Column 12,
Line 60, after "was" delete "the" and insert therefor --then--

Column 13
Line 8, after "was" delete "the" and insert therefor --then--

Column 15,
Line 35, after "iron" (first occurrence) delete "(fexrocene)" and insert therefor --(ferrocene)--

Column 15,
Line 36, before "1,1'-diacctylferrorene", delete "dibenzfeirocene" and insert therefor --dibenzferrocene--

Column 15,
Line 36, after "1,1'-" delete "diacctylferrorene" and insert therefor --diacetylferrocene--.

Column 15,
Line 37, after "1,1-", delete "diferroceneylithane" and insert therefor --diferrocenylethane--

Column 15,
Line 38, before "methylamino", delete "dinethylaninoethylferrocene" and insert therefor --dimethylaminoethylferrocene--.

UNITED STATES PATENT AND TRADEMARK OFFICE
CERTIFICATE OF CORRECTION

PATENT NO. : 6,689,825 B1
APPLICATION NO. : 10/065886
DATED : February 10, 2004
INVENTOR(S) : Chandra S. Bajgur et al.

It is certified that error appears in the above-identified patent and that said Letters Patent is hereby corrected as shown below:

Column 15,
Line 38, after "methyl-" delete "fercene" and insert therefor --ferrocene--

Column 15,
Line 42, before "the" delete "ferrocenecarboxaldhyde" and insert therefor --ferrocenecarboxaldehyde--

Column 15,
Line 43, after "phenylcyclopentaferrocene" delete "1,1 '(-1,3-cyclopenylene)" and insert therefor -- 1,1' (-1,3-cyclopentylene) --

Column 15,
Line 44, after "ferrocene" delete "phenylcyclopedtylferrocene" and insert therefor --phenylcyclopentylferrocene--

Column 15,
Line 45, before "and" delete "acetylferiocene" and insert therefor --acetylferrocene--

Column 15,
Line 66, after "iron" (first occurrence) delete "acetlacetonate," and insert therefor --acetylacetonate--

Column 15,
Line 67, after "iron" (first occurrence) delete "benzinidazolyl" and insert therefor --benzimidazolyl--.

Column 16,
Line 2, after "diacetylferrocene," delete "1,2 diacetylferrocren" and insert therefor -- 1,2 diacetylferrocene --

Column 16,
Line 3, before "dimethylaminoethylferrocene", delete "diferroceneylethane" and insert therefor --diferrocenylethane--

Column 16,
Line 7, before "the", delete "phenylfeffocene, ferrocenecarboxaldhyde," and insert therefor --phenylferrocene, ferrocenecarboxaldehyde,--.

UNITED STATES PATENT AND TRADEMARK OFFICE
CERTIFICATE OF CORRECTION

PATENT NO. : 6,689,825 B1
APPLICATION NO. : 10/065886
DATED : February 10, 2004
INVENTOR(S) : Chandra S. Bajgur et al.

It is certified that error appears in the above-identified patent and that said Letters Patent is hereby corrected as shown below:

Column 16,
Line 9, before "ferrocene" delete "cyclopenylene)" and insert therefor --cyclopentylene)--.

Column 17,
Line 4, after "is a", delete "polyphenytene" and insert therefor --polyphenylene--.

This certificate supersedes Certificate of Correction issued January 2, 2007.

Signed and Sealed this

Twenty-seventh Day of November, 2007

JON W. DUDAS
*Director of the United States Patent and Trademark Office*